US010319164B1

(12) United States Patent
Sprogis

(10) Patent No.: US 10,319,164 B1
(45) Date of Patent: Jun. 11, 2019

(54) TRANSIT GATELINE INCORPORATING DISPLAY-INTEGRATED BARRIERS

(71) Applicant: Cubic Corporation, San Diego, CA (US)

(72) Inventor: Robert Sprogis, Wake Forest, NC (US)

(73) Assignee: Cubic Corporation, San Diego, CA (US)

(\*) Notice: Subject to any disclaimer, the term of this patent is extended or adjusted under 35 U.S.C. 154(b) by 0 days.

(21) Appl. No.: 16/196,264

(22) Filed: Nov. 20, 2018

Related U.S. Application Data

(60) Provisional application No. 62/631,331, filed on Feb. 15, 2018.

(51) Int. Cl.
*G07C 9/00* (2006.01)
*G06F 3/14* (2006.01)

(52) U.S. Cl.
CPC ....... *G07C 9/00309* (2013.01); *G06F 3/1423* (2013.01); *G07C 2009/00396* (2013.01)

(58) Field of Classification Search
CPC ........... G06Q 30/0242; G06Q 30/0244; G06Q 30/0245; G06Q 30/0251–0271; G06F 3/14; G06F 3/1423; G06F 3/147
See application file for complete search history.

(56) References Cited

U.S. PATENT DOCUMENTS

| | | | | |
|---|---|---|---|---|
| 2006/0260166 A1* | 11/2006 | Pate | ................... | G09F 19/22 40/606.03 |
| 2010/0287043 A1* | 11/2010 | Gould | ................... | G06Q 30/02 705/14.12 |
| 2011/0213656 A1 | 9/2011 | Turner | | |
| 2014/0096447 A1* | 4/2014 | Harucksteiner | ......... | E06B 11/08 49/31 |
| 2014/0163706 A1* | 6/2014 | Wilen | ................ | G07F 17/32 700/92 |
| 2016/0055689 A1 | 2/2016 | Raina et al. | | |
| 2016/0071146 A1* | 3/2016 | Chan | .............. | G06Q 30/0248 705/14.47 |
| 2016/0225016 A1* | 8/2016 | Patel | .............. | G06Q 30/0245 |
| 2017/0055157 A1 | 2/2017 | Bergdale et al. | | |
| 2017/0154484 A1* | 6/2017 | Pluss | .............. | G07C 9/00309 |
| 2019/0082292 A1* | 3/2019 | Pulitzer | ............ | H04W 4/021 |

OTHER PUBLICATIONS

International Search Report and Written Opinion dated Feb. 20, 2019 in International Patent Application No. PCT/US2018/062452 filed Nov. 26, 2018, all pages.

\* cited by examiner

*Primary Examiner* — Laura N Nguyen
(74) *Attorney, Agent, or Firm* — Kilpatrick Townsend & Stockton

(57) ABSTRACT

Systems and methods for providing transit access using display-integrated barriers. One embodiment includes a gateline having a first display-integrated barrier configured to display a first visual message and to be moved to allow a holder of a portable electronic device to enter the transit system. The gateline may include a receiving antenna configured to receive a wireless electromagnetic signal transmitted by a portable electronic device. A transit server may transmit an inquiry signal regarding an aspect of the first visual message to the portable electronic device, receive a response signal, and analyze the response signal to determine that the response signal correctly verifies the aspect of the first visual message. The transit server may effect a transit data augmentation amount to an account associated with the portable electronic device.

16 Claims, 12 Drawing Sheets

TRANSIT GATELINE INCORPORATING DISPLAY-INTEGRATED BARRIERS

CROSS-REFERENCES TO RELATED APPLICATIONS

This Application claims priority to U.S. Provisional Patent Application No. 62/631,331 filed Feb. 15, 2018, the entire disclosure of which is hereby incorporated by reference, for all purposes, as if fully set forth herein.

BACKGROUND OF THE INVENTION

As populations in the world's largest cities continue to grow, often at an exponential rate, public and private transportation systems are becoming increasingly burdened with increased ridership and transit stations are becoming increasingly congested, causing delays to transit users and increased costs to the transportation systems. The use of sophisticated communication devices presents an appealing approach for managing such overcrowding. Unfortunately, existing devices and approaches are insufficient to alleviate these problems. Accordingly, new systems, methods, and other techniques are needed.

BRIEF SUMMARY OF THE INVENTION

A summary of the invention is described in reference to one or more examples listed below. As used below, any reference to a series of examples is to be understood as a reference to each of those examples disjunctively (e.g., "Examples 1-4" is to be understood as "Examples 1, 2, 3, or 4").

Example 1 is a transit system having display-integrated barriers, the transit system comprising: a gateline comprising: a first gate comprising: a first display-integrated barrier configured to display a first visual message and to be moved to allow a holder of a portable electronic device to enter the transit system; and a first receiving antenna configured to receive a wireless electromagnetic signal transmitted by a portable electronic device; a second gate comprising: a second display-integrated barrier configured to display a second visual message and to be moved to allow the holder of a portable electronic device to enter the transit system; and a second receiving antenna configured to receive the wireless electromagnetic signal transmitted by the portable electronic device; one or more processors configured to perform operations comprising: receiving the first visual message and the second visual message; sending the first visual message to the first display-integrated barrier and the second visual message to the second display-integrated barrier; and determining that a holder of the portable electronic device entered the transit system through the first gate based on the first receiving antenna receiving the wireless electromagnetic signal; a transit server configured to perform actions including: sending the first visual message and the second visual message to the gateline; transmitting an inquiry signal regarding an aspect of the first visual message to the portable electronic device; receiving, from the portable electronic device, a response signal; analyzing the response signal to determine that the response signal correctly verifies the aspect of the first visual message; and effecting a transit data augmentation amount to an account associated with the portable electronic device.

Example 2 is the transit system of example(s) 1, wherein the first visual message is selected by the transit server based on historical data associated with the portable electronic device.

Example 3 is the transit system of example(s) 1-2, wherein the inquiry signal includes a question regarding the aspect of the first visual message and the response signal includes a user-entered response to the question.

Example 4 is the transit system of example(s) 1-3, wherein the one or more processors are integrated with the first gate.

Example 5 is a transit system comprising: a gateline comprising: a first gate comprising: a first display configured to display a first visual message; and a receiving antenna configured to receive a wireless electromagnetic signal transmitted by a portable electronic device; one or more processors configured to perform operations comprising: receiving the first visual message; and determining that a holder of the portable electronic device entered the transit system through the first gate based on the receiving antenna receiving the wireless electromagnetic signal; a transit server configured to perform actions including: sending the first visual message to the gateline; transmitting an inquiry signal regarding an aspect of the first visual message to the portable electronic device; receiving, from the portable electronic device, a response signal; analyzing the response signal to determine that the response signal correctly verifies the aspect of the first visual message; and effecting a transit data augmentation amount to an account associated with the portable electronic device.

Example 6 is the transit system of example(s) 5, wherein the first gate further comprises a physical barrier, wherein the gateline is configured to allow the holder of the portable electronic device to enter the transit system by removing the physical barrier.

Example 7 is the transit system of example(s) 5-6, wherein the first display is integrated with the physical barrier.

Example 8 is the transit system of example(s) 5-7, wherein the gateline further comprises: a second gate including a second display configured to display a second visual message, wherein the transit server is configured to send the second visual message to the gateline.

Example 9 is the transit system of example(s) 5-8, wherein the first visual message is selected by the transit server based on historical data associated with the portable electronic device.

Example 10 is the transit system of example(s) 5-9, wherein the inquiry signal includes a question regarding the aspect of the first visual message and the response signal includes a user-entered response to the question.

Example 11 is the transit system of example(s) 5-10, wherein the one or more processors are integrated with the first gate.

Example 12 is the transit system of example(s) 5-11, wherein the first display is positioned along a side of the first gate facing a non-restricted access area of the transit system.

Example 13 is a computer-implemented method comprising: sending, by a transit server of a transit system to a gateline, a first visual message; displaying, by a first display associated with a first gate of the gateline, the first visual message; receiving, by the gateline via a receiving antenna associated with the first gate, a wireless electromagnetic signal transmitted by a portable electronic device; determining that a holder of the portable electronic device entered the transit system through the first gate based on the receiving antenna receiving the wireless electromagnetic signal; transmitting an inquiry signal regarding an aspect of the first visual message to the portable electronic device; receiving, from the portable electronic device, a response signal; analyzing the response signal to determine that the response signal correctly verifies the aspect of the first visual message; and effecting a transit data augmentation amount to an account associated with the portable electronic device.

Example 14 is the computer-implemented method of example(s) 13, wherein the gateline is configured to allow the holder of the portable electronic device to enter the transit system through the first gate by removing a physical barrier associated with the first transit gate.

Example 15 is the computer-implemented method of example(s) 13-14, further comprising: receiving, by the gateline from the transit server, a second visual message; and displaying, by a second display associated with a second gate of the gateline, the second visual message.

Example 16 is the computer-implemented method of example(s) 13-15, wherein the first visual message is selected by the transit server based on historical data associated with the portable electronic device.

Example 17 is the computer-implemented method of example(s) 13-16, wherein the response signal is received by the transit server from the portable electronic device.

Example 18 is the computer-implemented method of example(s) 13-17, wherein the response signal is analyzed by the transit server.

Example 19 is the computer-implemented method of example(s) 13-18, wherein the transit data augmentation amount is effected to the account by the transit server.

Example 20 is the computer-implemented method of example(s) 13-19, wherein the inquiry signal includes a question regarding the aspect of the first visual message and the response signal includes a user-entered response to the question.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

In the appended figures, similar components and/or features may have the same numerical reference label. Further, various components of the same type may be distinguished by following the reference label by a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF THE INVENTION

Systems, methods, and other techniques are provided in the present disclosure for enabling transit access using display-integrated barriers. In some instances, one or more display-integrated barriers display visual messages received from a transit server as transit users pass through individual gates within a gateline. Each of the display-integrated barriers may be configured to retract into a gate cabinet upon a mobile device held by the transit user transmitting an electromagnetic signal to a receiving antenna at a particular gate. A display may be integrated into a single side of a barrier facing a non-restricted access area such that a transit user may only view the display while situated in the non-restricted access area. The display may receive electrical data and power signals through an electrical conductor channeled through the inside of the barrier. In some instances, the barrier may rotate about a pivot point that may be used to provide electrical connectivity between the display and a gate or gateline processor.

Some embodiments of the present invention allow for a transit data augmentation amount to be effected to an account associated with a transit user and/or the transit user's mobile device (e.g., an account linked to a transit application operating on the transit user's mobile device). In some instances, a transit application operating on the transit user's mobile device may request information from the transit user regarding an aspect of the displayed visual message. Upon receiving the transit user's input, the mobile device may transmit a response signal to the gate, the gateline, and/or the transit server. The response signal may be analyzed to determine whether a transit data augmentation amount will be applied to the transit user's account.

Figure 1:
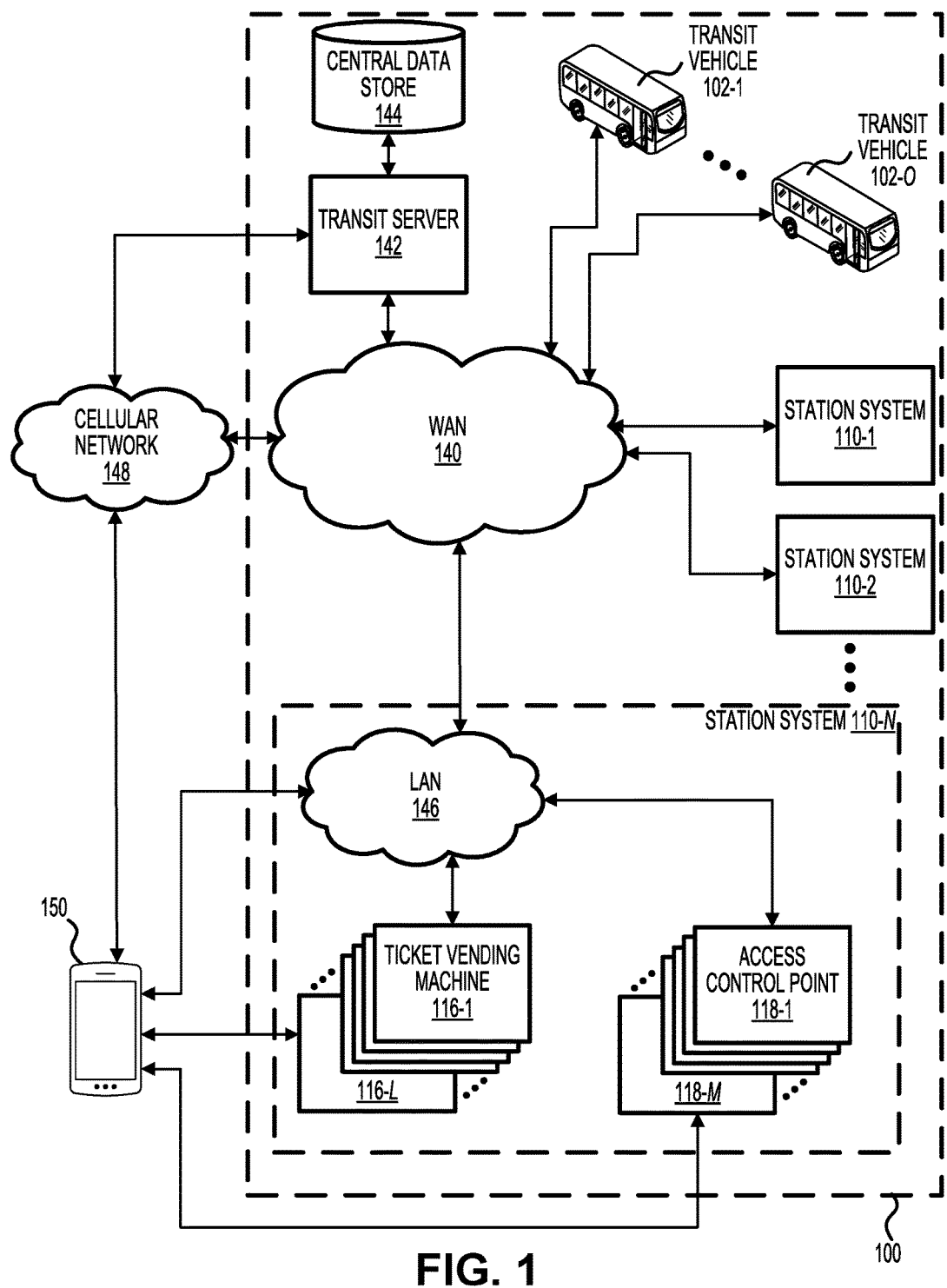
FIG. 1 illustrates a block diagram of a transit system in communication with a portable electronic device, according to some embodiments of the present invention.

FIG. 1 illustrates a block diagram of a transit system 100 in communication with a portable electronic device 150, according to some embodiments of the present invention. Transit system 100 can include various forms of transit, including subway, bus, ferry, commuter rail, para-transit, etc., or any combination thereof. Transit system 100 may include a plurality of station systems 110 located at a plurality of transit locations (or simply "locations") within transit system 100. While station systems 110 are generally considered to be fixed at transit locations, transit vehicles 102 move along predetermined routes often between different transit locations. For example, a transit user may begin a trip within transit system 100 at one of station systems 110 and may travel within one of transit vehicles 102 to another of station systems 110. Examples of transit vehicles 102 may include a train, a bus, a ferry, a plane, among other possibilities. Transit system 100 achieves interconnectivity between station systems 110, transit vehicles 102, and a transit server 142 via a wide area network (WAN) 140, which may include one or more wired and/or wireless connections. Devices within each of station systems 110 are locally interconnected via a local area network (LAN) 142, which may include one or more wired and/or wireless connections. Data used by transit server 142 in connection with operation of transit system 100 may be stored in a central data store 144 communicatively coupled to transit server 142.

Each of the transit locations may include a non-restricted access area and a restricted access area. The non-restricted access area may include areas that are freely accessible to the general public, whereas the restricted access area may be reserved exclusively for customers of transit system 100. Examples of a restricted access area may include: the inside of transit vehicles 102, a bus or train platform, the inside of a bus or train station, and the like. Each of station systems 110 may include various transit machines such as ticket vending machines 116 and access control points 118. Typically, each of ticket vending machines 116 is configured to allow a transit user to purchase a transit product such as train or bus ticket and each of access control points 118 corresponds to a location where a transit product is to be presented or is required to be in the transit user's possession. In some embodiments, each of access control points 118 includes an entry point to transit system 100 that defines a passageway and separates the non-restricted access area from the restricted access area. Examples of access control points 118 include a gate, a turnstile, a platform validator, an entrance/exit to transit vehicles 102, among other possibilities. Each of ticket vending machines 116 and access control points 118 may be communicatively coupled to LAN 146 via one or more wired and/or wireless connections.

In some embodiments, transit users may create and maintain a transit user account. The transit user account can comprise information regarding the transit user, such as a name, address, phone number, email address, user identification (such as a unique identifier of the user or other user ID), passcode (such as a password and/or personal identification number (PIN)), an identification code associated with a fare media used to identify a transit user and/or a transit user account, information regarding user preferences and user opt-in or opt-out selections for various services, product(s) associated with the transit user account, a value and/or credit associated with the product(s), information regarding a funding source for the transit user account, among other possibilities. A transit user may request a transit user account and provide the information listed above by phone (such as a call to a customer service center maintained and/or provided by transit system 100), on the Internet, at one of ticket vending machines 116, or by other means. Transit server 142 can use the information provided by the user to create the transit user account, which can be stored and/or maintained on a database, such as central data store 144.

In some embodiments, a funding source can be linked to a transit user account to provide funding to purchase transit products. The funding source can be external to transit system 100 and can be maintained by a financial institution. Such a funding source may include a savings or checking account, a prepaid account, a credit account, an e-commerce account (such as a PAYPAL® account), or more, which can transfer funds via automated clearing house (ACH) or other means. If a transit user account comprises information regarding a funding source, transit server 142 can use the information to fund purchases or other transactions of a transit user. These transactions can be made at station systems 110, transit vehicles 102, on the Internet, by phone, text, email, or a variety of other different ways, and transaction information can then be sent to transit server 142 to update the transit user account associated with the transactions and reconcile payments and purchases with the funding source. The transit server 142 can communicate with the financial institution (or other entity maintaining the funding source) through a financial network (not shown).

A transit user may interact with transit system 100 using a portable electronic device 150 communicatively coupled with various components of transit system 100. Portable electronic device 150 may be a smart phone or other mobile phone (including a near-field-communication (NFC)-enabled mobile phone), a tablet personal computer (PC), a personal digital assistant (PDA), an e-book reader, or other device. A communicative link from portable electronic device 150 to transit server 142 can be provided by a cellular network 148 in communication with WAN 140 or in direct communication with transit server 142. Portable electronic device 150 can thereby access and/or manage information of a transit user account. Furthermore, transit server 142 can send messages to portable electronic device 150 providing transit, account, and/or advertisement information to the transit user in possession of portable electronic device 150. Such messages may be based on, among other things, opt-in or opt-out selections and/or other user preferences as stored in a transit user account. A transit user can use portable electronic device 150 to download a transit application from transit server 142 or from a mobile application source. The mobile application source may be an application store or website provided by a mobile carrier or the hardware and/or software provider of portable electronic device 150.

Figure 2:
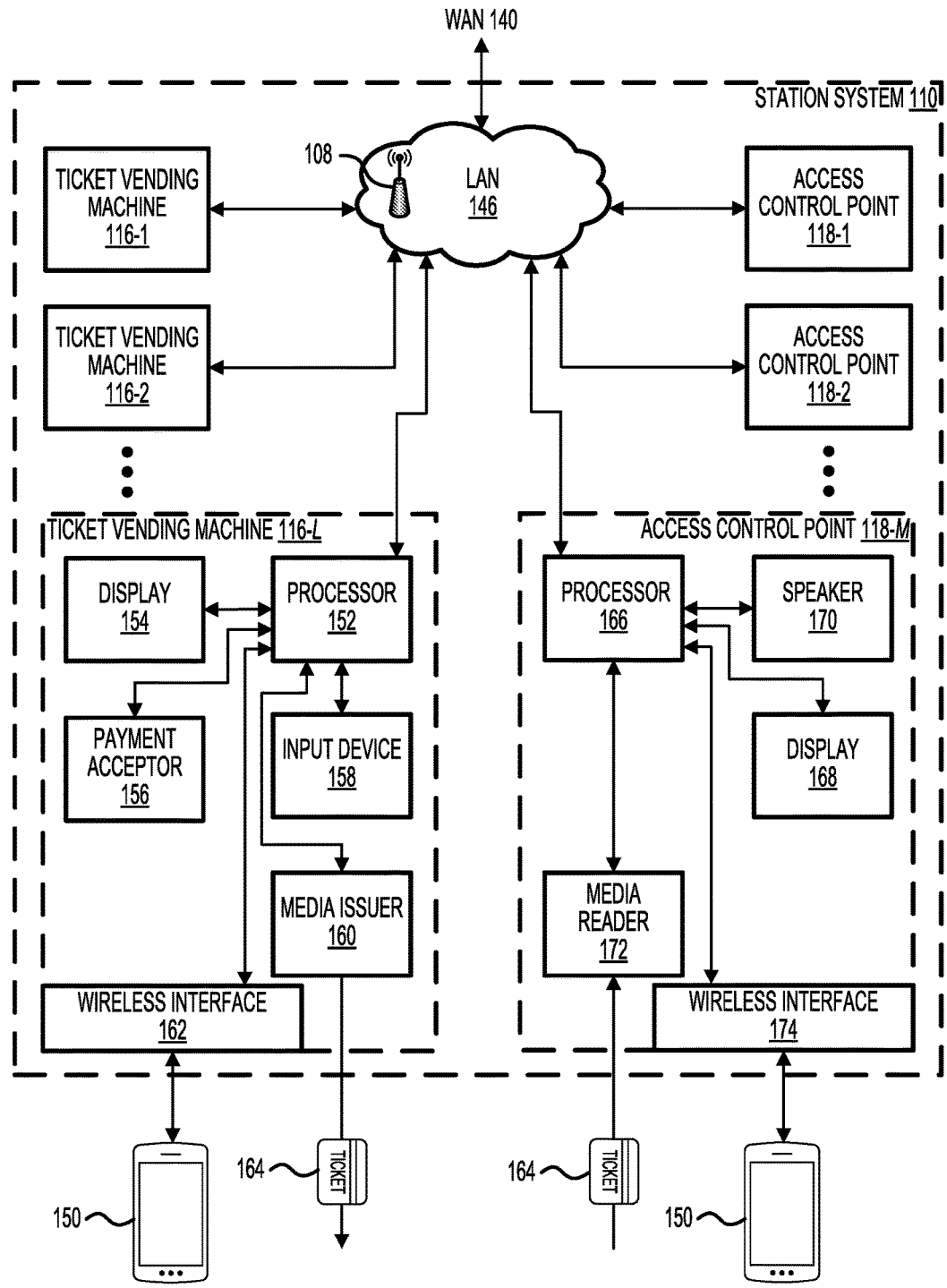
FIG. 2 illustrates a block diagram of station system in communication with portable electronic device, according to some embodiments of the present invention.

FIG. 2 illustrates a block diagram of station system 110 in communication with portable electronic device 150, according to some embodiments of the present invention. Any description provided herein in reference to components within station system 110 may also apply to components within transit vehicle 102, and vice-versa. For example, transit vehicle 102 may include any components described in reference to FIG. 2. Specific components of ticket vending machines 116 and access control points 118 may vary from the illustrated embodiment. In some instances, each of ticket vending machines 116 includes a processor 152 communicatively coupled with LAN 146. Processor 152 may include a single or multiple processors and an associated memory. Processor 152 may control a display 154 to display instructions for a transit user and/or a GUI through which the transit user may interact. Each of ticket vending machines 116 may further include a payment acceptor 156 for accepting cash, coin, or card-based payments, an input device 158 (such as a keypad) for receiving input from a transit user, and a media issuer 160 for dispensing a fare media 164 to the transit user. Media issuer 160 may include a printer for printing a new fare media 164 and/or a media reader/writer for adding additional value to an existing fare media 164. Each of ticket vending machines 116 may include a wireless interface 162 for enabling wireless communications between portable electronic device 150 and each of ticket vending machines 116.

In some instances, each of access control points 118 includes a processor 166 communicatively coupled with LAN 146. Processor 166 may include a single or multiple processors and an associated memory. Processor 166 may control a display 168 and a speaker 170 to provide visual and audible instructions for a transit user. Each of access control points 118 may include a media reader 172 for reading fare media 164 and, in conjunction with processor 166, for determining whether a transit user is permitted to access the non-restricted access area. Alternatively or additionally, media reader 172 may communicate with portable electronic device 150 to determine whether the transit user is permitted to access the non-restricted access area. Media reader 172 may include a contactless reader and/or a reader that requires contact with the object to be read. In some instances, media reader 172 includes a barcode reader and a barcode display. In some embodiments, display 168 and speaker 170 can give visual and audible instructions to the holder of portable electronic device 150 or fare media 164 that portable electronic device 150 or fare media 164 is not correctly placed to communicate with media reader 172. Each of access control points 118 may include a wireless interface 174 for enabling wireless communications between portable electronic device 150 and each of access control points 118. One of skill in the art will recognize that barriers associated with access control point 118 may open up to allow the holder of portable electronic device 150 or fare media 164 passage upon a successful communication between media reader 172 and portable electronic device 150 or fare media 164.

In some embodiments, wireless interfaces 162 and 174 may enable communication with portable electronic device 150 and fare media 164 by the transmission and reception of electromagnetic wireless signals. For example, devices may communicate using NFC, BLE, radio-frequency identification (RFID), and the like. In some embodiments, media reader 172 may include an RFID reader and fare media 164 may include an RFID tag. The RFID tag may be may be passive, active, or battery-assisted passive. In some embodiments, active RFID tags may be turned on and off by a user pressing a button on the RFID tag. Such embodiments may save power and preserve battery life.

In some embodiments, station system 110 may include a wireless access point 108 for providing connectivity to LAN 146 to a variety of devices within or near the transit location. For example, each of ticket vending machines 116 and access control points 118 may wirelessly connect to wireless access point 108. Portable electronic device 150 may be configured to automatically or manually connect to wireless access point 108 when the transit user holding the device is within the range of wireless access point 108.

Figure 3:
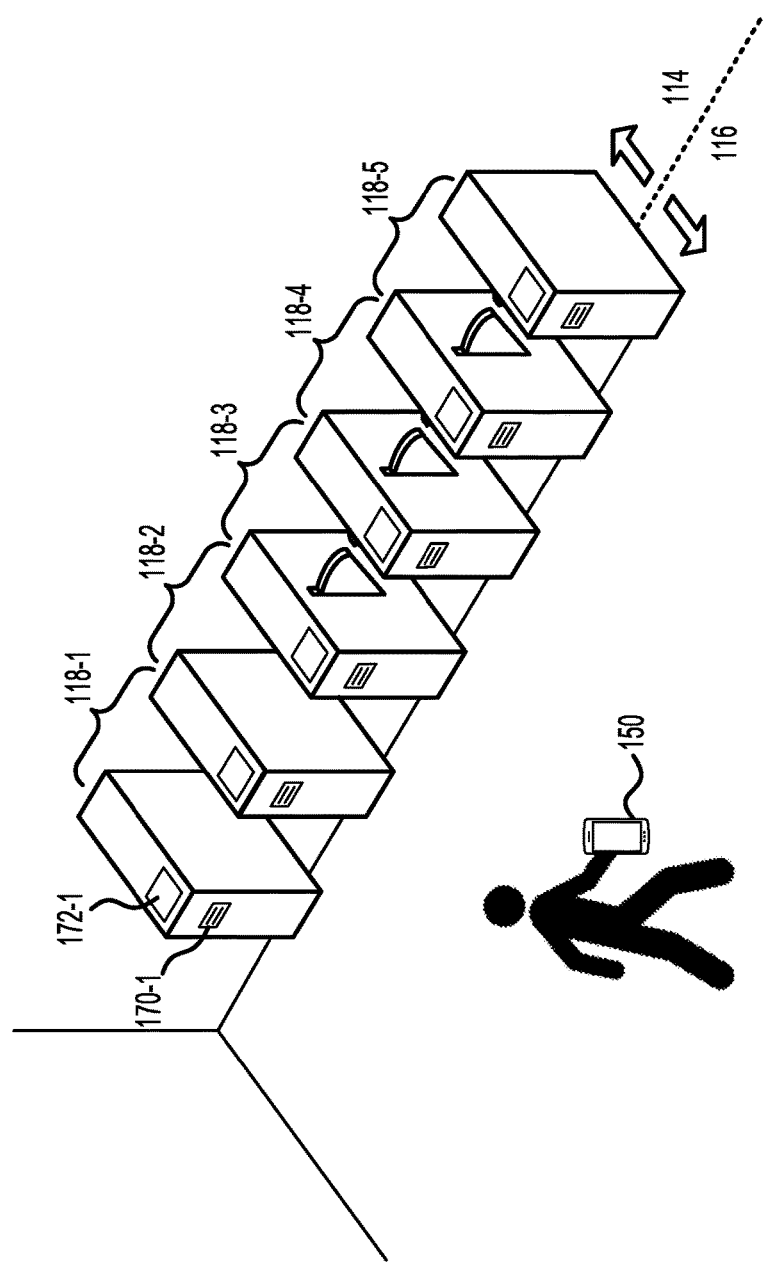
FIG. 3 illustrates an example of a transit location having various access control points, according to some embodiments of the present invention.

FIG. 3 illustrates an example of a transit location having various access control points 118, according to some embodiments of the present invention. Access control points 118 may include a plurality of gates separating a restricted access area 114 from a non-restricted access area 116. One or more of access control points 118 may be barrierless (i.e., "gateless") (e.g., access control points 118-1 and 118-2) and one or more of access control points 118 may include barriers (e.g., access control points 118-3, 118-4, and 118-5). Each of access control points 118 may include media reader 172 positioned along one or both sides of the passageways formed by each of access control points 118. Each of access control points 118 may also include speaker 170 positioned near media reader 172 such that the holder of portable electronic device 150 may be near speaker 170 when a barcode displayed by portable electronic device 150 is read by media reader 172.

Figure 4:
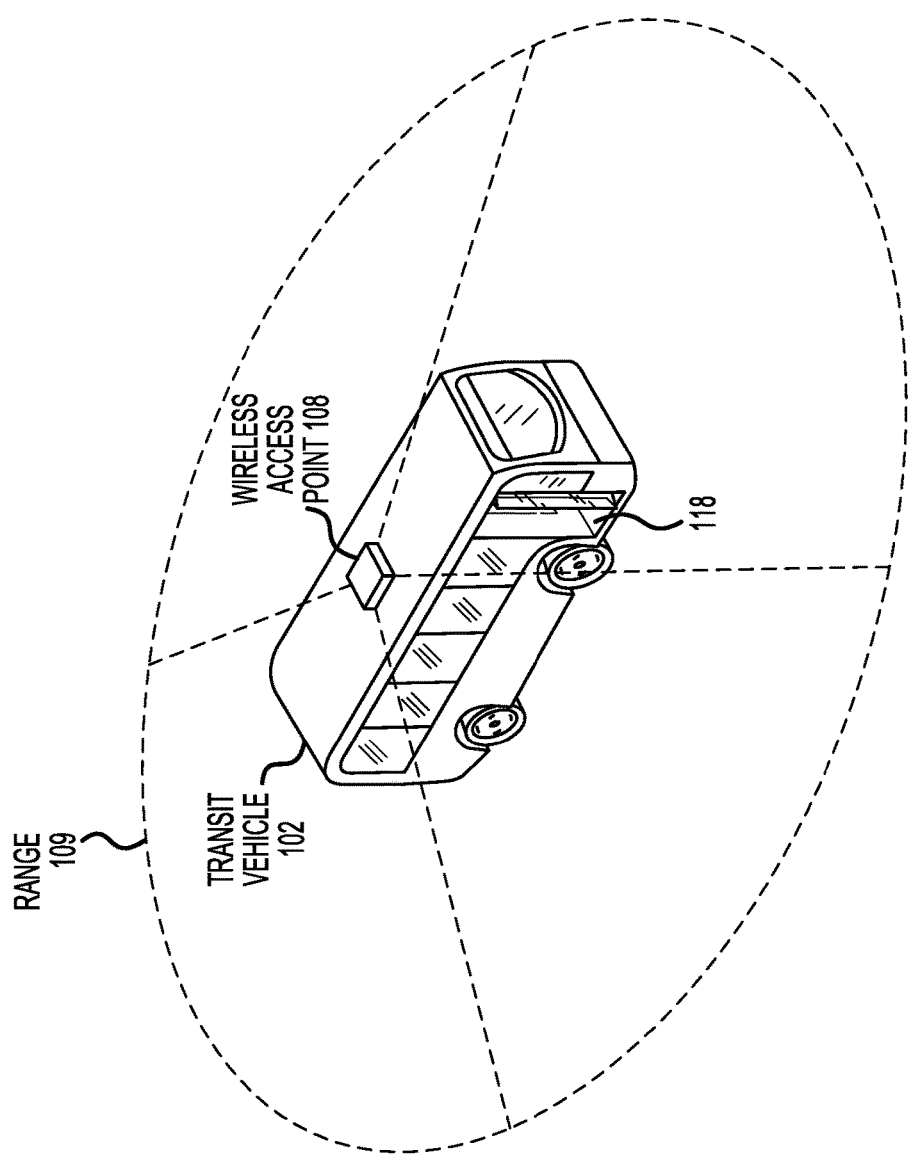
FIG. 4 illustrates a possible positioning of a wireless access point on the roof of a transit vehicle, according to some embodiments of the present invention.

FIG. 4 illustrates a possible positioning of wireless access point 108 on the roof of transit vehicle 102, according to some embodiments of the present invention. Portable electronic device 150 may connect to LAN 138 upon entering a range 109 associated with wireless access point 108. Portable electronic device 150 may use the connection to LAN 138 to communicate with transit server 142 or ticket vending machine 116 to purchase a transit product and/or to communicate with access control point 118 to gain access to transit vehicle 102. As shown in the illustrated embodiment, access control point 118 may correspond to an entrance to transit vehicle 102.

Figure 5:
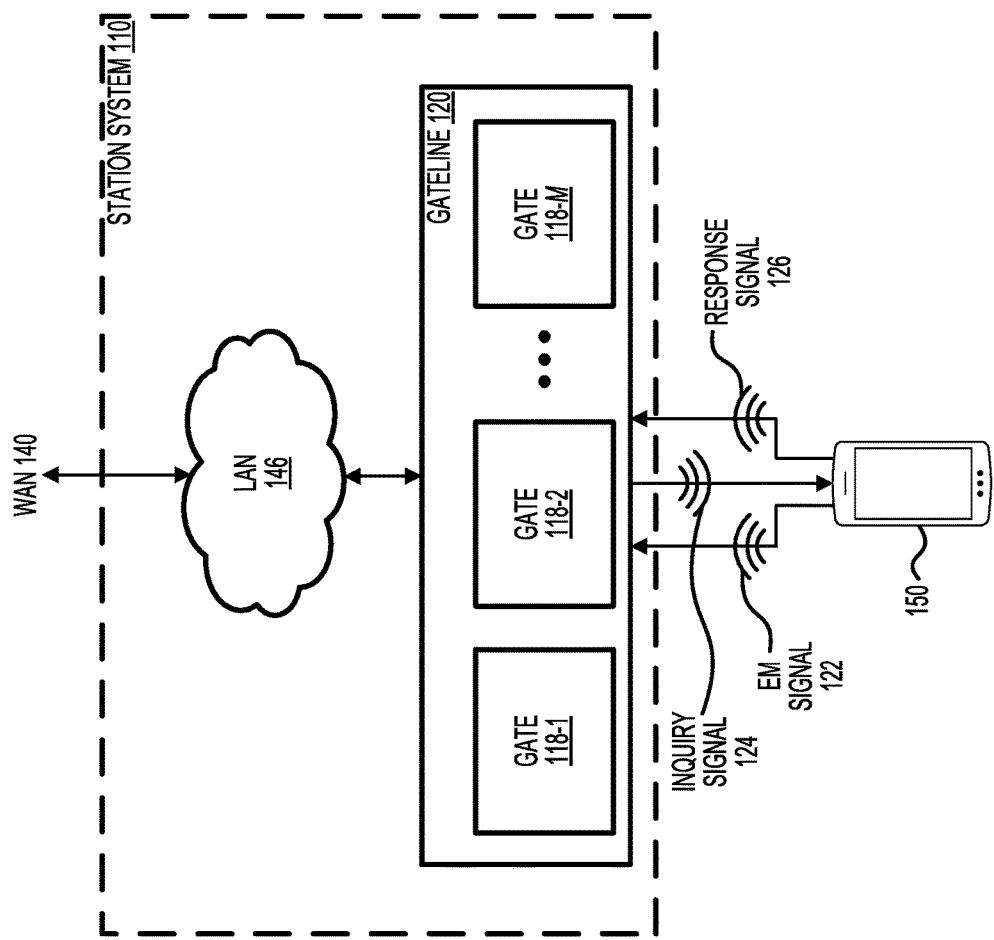
FIG. 5 illustrates a block diagram of a station system including a gateline comprising one or more gates, according to some embodiments of the present invention.

FIG. 5 illustrates a block diagram of station system 110 including a gateline 120 comprising one or more gates 118, according to some embodiments of the present invention. One or more of gates 118 of gateline 120 may share one or more components, such as processor 166, display 168 and/or wireless interface 174. For example, one or more of gates 118 may share a receiving antenna and/or transmitting antenna. In some embodiments, each of gates 118 includes a media reader 172 or and/or a wireless interface 174 that includes a receiving antenna for receiving an electromagnetic (EM) signal 122 transmitted by portable electronic device 150. EM signal 122 may identify portable electronic device 150 and/or the holder of portable electronic device 150. EM signal 122 may further indicate that the holder of portable electronic device 150 desires to enter transit system 100 through a particular gate of gates 118 (e.g., first gate 118-1).

In response to receiving EM signal 122, gateline 120 or one of gates 118 may transmit an inquiry signal 124 to portable electronic device 150. Inquiry signal 124 may include data for determining whether the holder of portable electronic device 150 viewed a message displayed by one of displays 168 (e.g., first display 168-1). In response to receiving inquiry signal 124, portable electronic device 150 may transmit a response signal 126 to gateline 120 or one of gates 118. Response signal 126 may indicate whether the holder of portable electronic device 150 correctly verified an aspect of the message displayed by one of displays 168. Signals 122, 124, 126 are described further in reference to FIG. 10.

Figure 6:
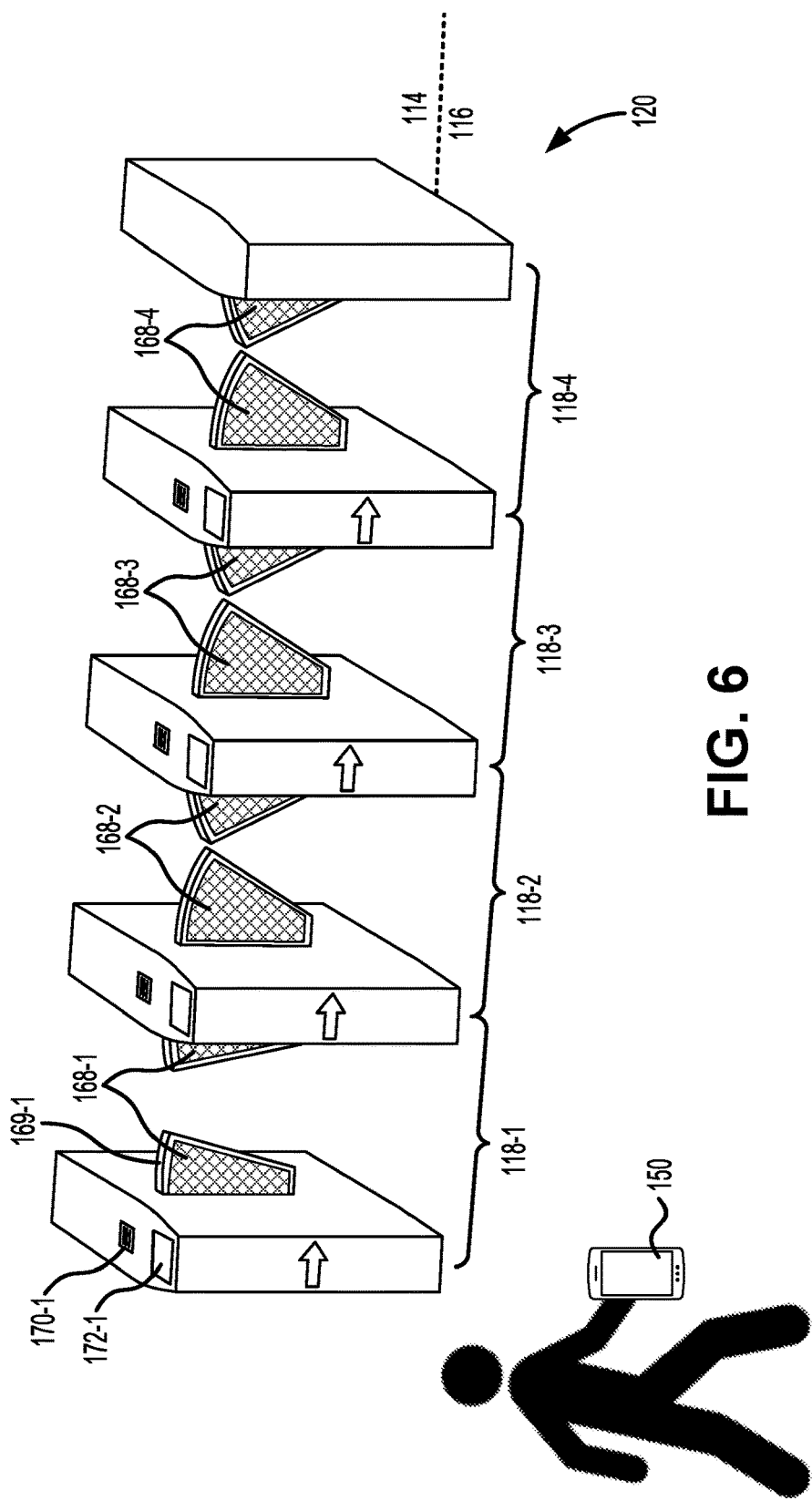
FIG. 6 illustrates a gateline incorporating display-integrated barriers, according to some embodiments of the present invention.

FIG. 6 illustrates a gateline 120 incorporating display-integrated barriers, according to some embodiments of the present invention. Gateline 120 includes four gates 118 each including a media reader 172, a speaker 170, a display 168, and two barriers 169. Display-integrated barriers are formed by display 168 being integrated with barrier 169 such that movement of barrier 169 causes simultaneous movement of display 168. In the illustrated embodiment, each of displays 168 are positioned along a side of barriers 169 facing non-restricted access area 116 such that a transit user situated within non-restricted access area 116 is able to view one or more of displays 168 and a transit user situated within restricted access area 114 is unable to view any of displays 168. In some embodiments, each of the display-integrated barriers are retractable into gate cabinets of gates 118 such that displays 168 become partially obscured while the barriers are retracted.

Figure 7:
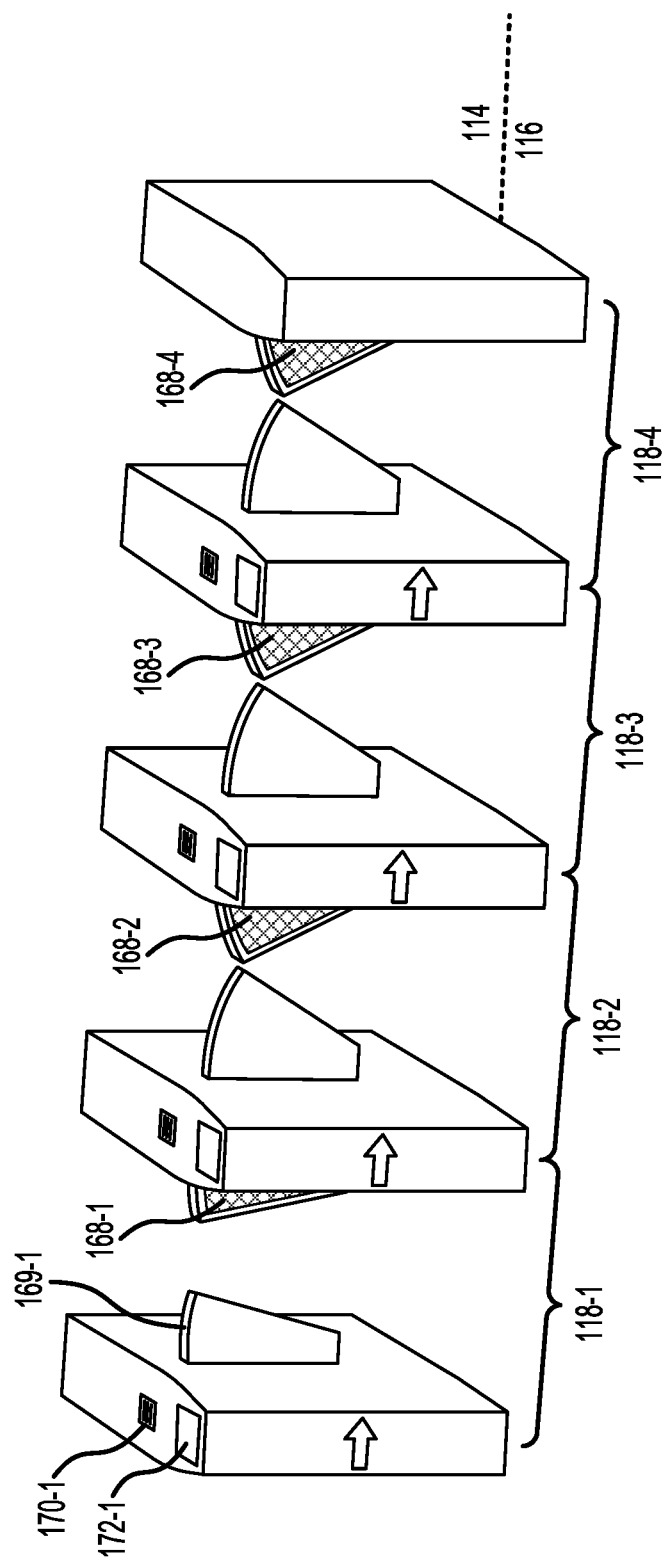
FIG. 7 illustrates a gateline incorporating display-integrated barriers, according to some embodiments of the present invention.

FIG. 7 illustrates a gateline 120 incorporating display-integrated barriers, according to some embodiments of the present invention. Gateline 120 includes four gates 118 each including a media reader 172, a speaker 170, a display 168, and two barriers 169. In the illustrated embodiment, each of displays 168 are positioned along a side of barriers 169 facing non-restricted access area 116 such that a transit user situated within non-restricted access area 116 is able to view one or more of displays 168 and a transit user situated within restricted access area 114 is unable to view any of displays 168. Each of gates 118 includes a single display 168. For example, first gate 118-1 includes a single display 168-1 positioned along a side of one of barriers 169-1.

Figure 8:
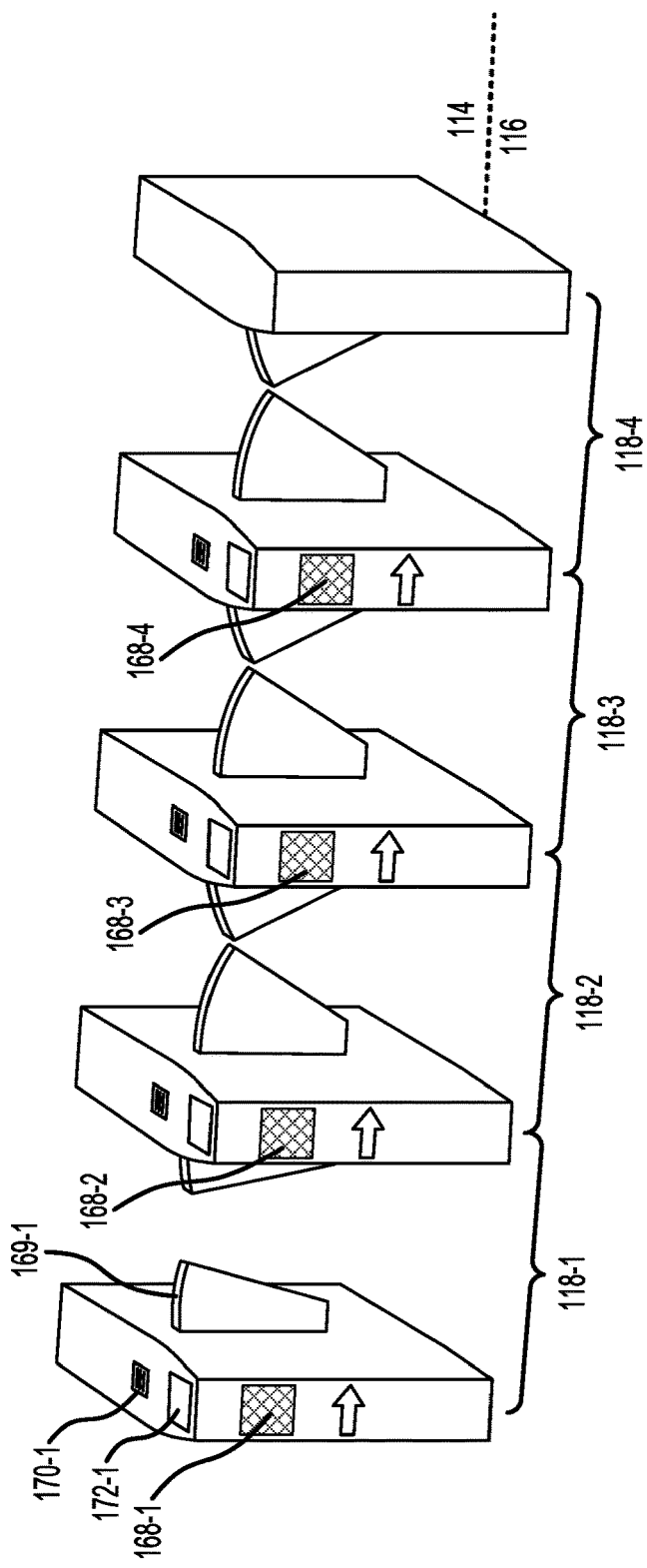
FIG. 8 illustrates a gateline, according to some embodiments of the present invention.

FIG. 8 illustrates a gateline 120, according to some embodiments of the present invention. Gateline 120 includes four gates 118 each including a media reader 172, a speaker 170, a display 168, and two barriers 169. In the illustrated embodiment, each of displays 168 are positioned along a side of a gate cabinet facing non-restricted access area 116 such that a transit user situated within non-restricted access area 116 is able to view one or more of displays 168 and a transit user situated within restricted access area 114 is unable to view any of displays 168. Each of gates 118 includes a single display 168. For example, first gate 118-1 includes a single display 168-1 positioned along a side of a gate cabinet of first gate 118-1.

Figure 9:
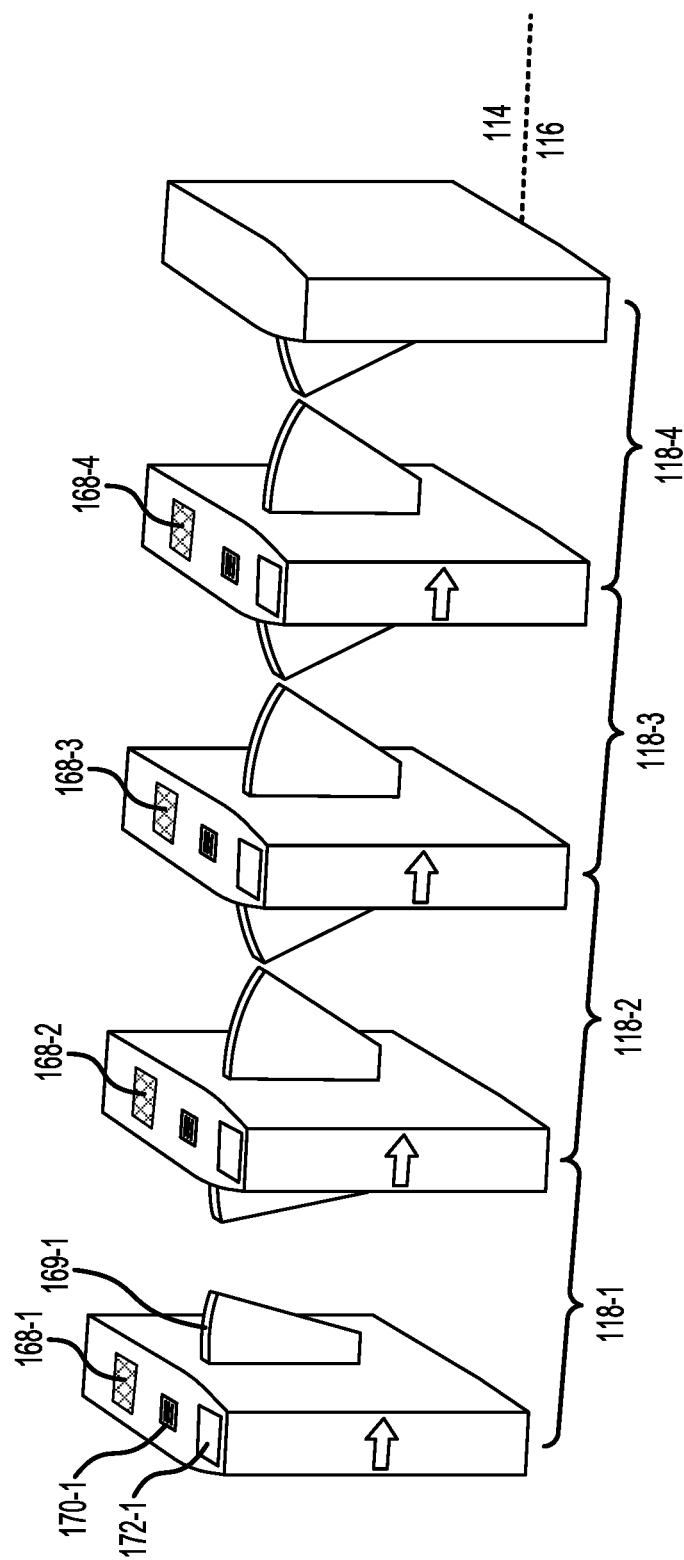
FIG. 9 illustrates a gateline, according to some embodiments of the present invention.

FIG. 9 illustrates a gateline 120, according to some embodiments of the present invention. Gateline 120 includes four gates 118 each including a media reader 172, a speaker 170, a display 168, and two barriers 169. In the illustrated embodiment, each of displays 168 are positioned along the top of a gate cabinet. Each of gates 118 includes a single display 168. For example, first gate 118-1 includes a single display 168-1 positioned along the top of a gate cabinet of first gate 118-1.

Figure 10:
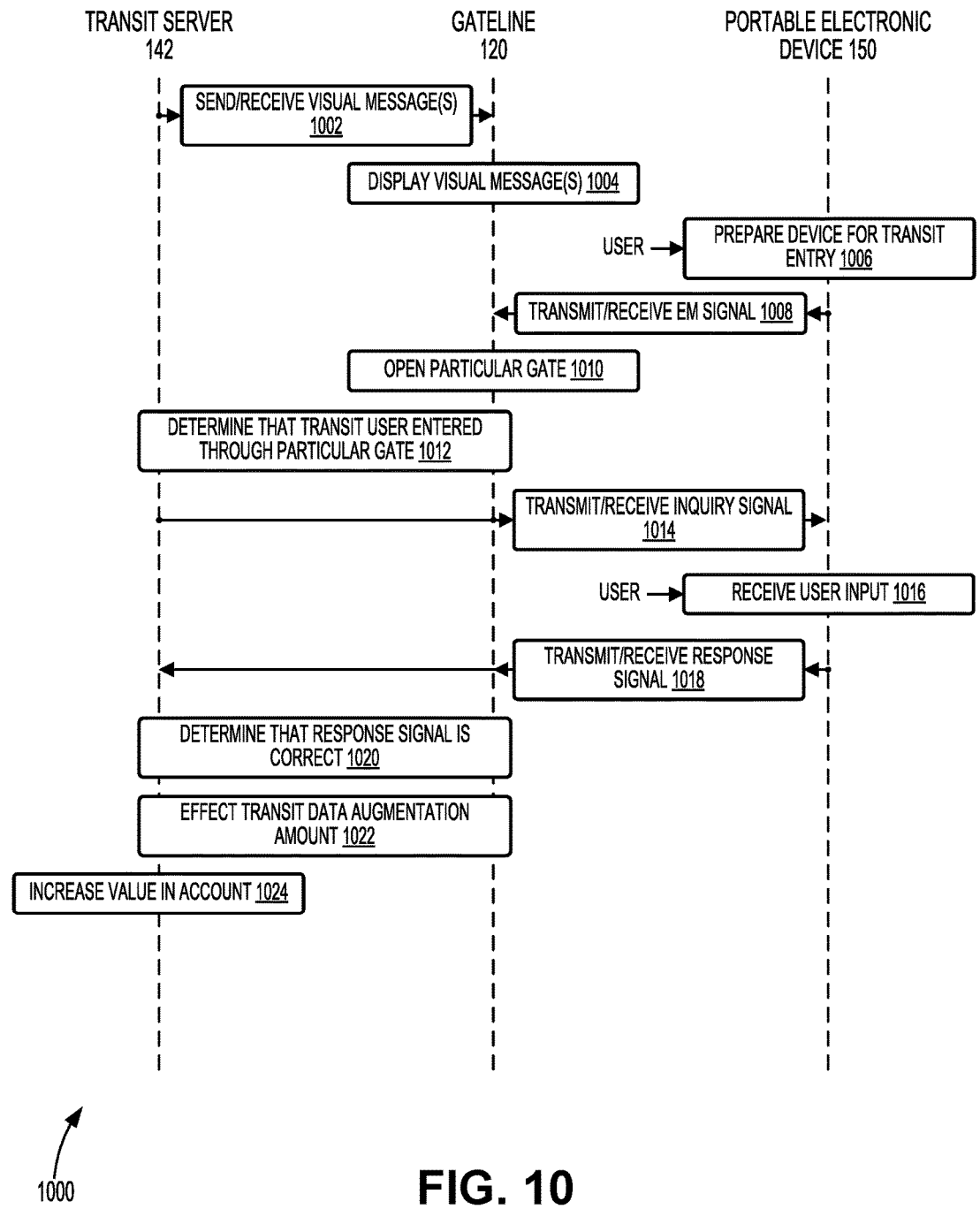
FIG. 10 illustrates a method, accordingly to some embodiments of the present invention.

FIG. 10 illustrates a method 1000, accordingly to some embodiments of the present invention. One or more steps of method 1000 may be performed by portable electronic device 150 and one or more steps of method 1000 may be performed by components of transit system 100 such as transit server 142 and gateline 120. Steps of method 1000 may be performed in an order different than the illustrated embodiment, and one or more steps of method 1000 may be omitted.

At step 1002, transit server 142 sends one or more visual messages to gateline 120 and/or gateline 120 receives one or more visual messages from transit server 142. Each visual message may be an advertisement that promotes a product, a company, a service, a person, etc. through an image, a collection of images, a video, and the like. Each visual message may or may not include audio information that accompanies the visual content. Each visual message may contain data such that the visual message is displayable by display 168 associated with one of gates 118 of gateline 120. The visual messages may include a first visual message promoting a first product, company, or service, and/or a second visual message promoting a second product, company, or service. Transit server 142 may send the first visual message to first gate 118-1 of gateline 120 and the second visual message to second gate 118-2 of gateline 120. The visual messages may be stored locally at each of gates 118-1, 118-2 and/or at gateline 120 until the visual messages are displayed. In one particular implementation, the visual messages are sent from transit server 142 to portable electronic device 150 and are subsequently displayed by portable electronic device 150.

At step 1004, gateline 120 displays the visual messages received from transit server 142. In some embodiments, the first visual message may be displayed by first display 168-1 associated with first gate 118-1 and the second visual message may be displayed by second display 168-2 associated with second gate 118-2. In some embodiments, the first visual message may be displayed by each of displays 168-1, 168-2. In some embodiments, the first visual message may be displayed by first display 168-1 for a first duration of time and be displayed by second display 168-2 for a second duration of time. Accordingly, the first visual message may be displayed by displays 168-1, 168-2 concurrently or nonconcurrently. In some embodiments one or both of the first visual message and the second visual message are displayed in response to determining that the holder of portable electronic device 150 is approaching one or both of gates 118-1, 118-2.

At step 1006, portable electronic device 150 is prepared for entry into transit system 100 through gateline 120 by, for example, the holder of portable electronic device 150 indicating an intention to enter transit system 100 using a transit application operating on portable electronic device 150. In some embodiments, the holder of portable electronic device 150 may open a transit application on portable electronic device 150 and purchase and/or select a transit product. In some embodiments, portable electronic device 150 may automatically prepare for entry into transit system 100 by detecting that its location is near gateline 120. In some embodiments, portable electronic device 150 may be prepared for entry into transit system 100 by transmitting EM signal 122. EM signal 122 may be transmitted a single time or multiple times. For example, EM signal 122 may be transmitted periodically, continuously, or intermittently by portable electronic device 150.

At step 1008, portable electronic device 150 wirelessly transmits EM signal 122 to gateline 120 and/or gateline 120 receives EM signal 122 from portable electronic device 150. Alternatively or additionally, step 1008 may include portable electronic device 150 wirelessly transmitting EM signal 112 to first gate 118-1 via wireless interface 174 associated with first gate 118-1. In some embodiments, wireless interface 174 may include a receiving antenna configured to receive EM signal 122. EM signal 122 may identify portable electronic device 150 and/or the holder of portable electronic device 150. In some embodiments, upon receiving EM signal 122 and identifying portable electronic device 150 and/or the holder of portable electronic device 150, transit system 100 may determine whether the holder of portable electronic device 150 is permitted to access transit system 100 at first gate 118-1 by, for example, determining whether a transit product was purchased or can be purchased, or by determining whether a transit account associated with portable electronic device 150 contains sufficient value (i.e., value above a threshold).

At step 1010, the holder of portable electronic device 150 is allowed to enter the restricted access area of transit system 100 by opening first gate 118-1 within gateline 120. In some embodiments, allowing the holder of portable electronic device 150 to enter transit system 100 may include removing a physical barrier associated with first gate 118-1 (e.g., retracting a barrier, allowing a barrier to be moved, etc.). In some embodiments, allowing the holder of portable electronic device 150 to enter transit system 100 may include allowing passage through first gate 118-1 without triggering an alarm.

At step 1012, it is determined that the holder of portable electronic device 150 entered transit system 100 through first gate 118-1. In some embodiments, determining that the holder of portable electronic device 150 entered transit system 100 through first gate 118-1 is automatically determined upon receiving EM signal 122 and allowing the holder of portable electronic device 150 to enter transit system 100 through first gate 118-1 (e.g., opening first gate 118-1). In some embodiments, sensors may be employed (e.g., motion sensors, proximity sensors) to determine that the holder of portable electronic device 150 has physically passed through the first gate. In some embodiments, it may be determined that the holder of portable electronic device 150 entered transit system 100 through first gate 118-1 after the passage of a predetermined amount of time (e.g., 1 second, 5 seconds, 10 seconds, etc.) after performing one or both of steps 1006, 1008.

In some embodiments, the visual message being displayed at first gate 118-1 is modified upon determining that the holder of portable electronic device 150 has entered transit system 100 through first gate 118-1. In some embodiments, the visual message is modified upon determining that the holder of portable electronic device 150 has passed through a plane formed by first display 168-1 (e.g., the plane formed by extending first display 168-1 outward thereby intersecting the pathway of the holder of portable electronic device 150). The visual message may be modified by switching from the first visual message to a different visual message (e.g., second, third, fourth visual messages). Such embodiments improve method 1000 by allowing the method to be performed quickly for a large number of transit users while retaining a level of security by preventing users from viewing additional visual messages which may lead to manipulation of transit accounts.

At step 1014, inquiry signal 124 is transmitted by transit server 142 to portable electronic device 150 and/or inquiry signal 124 is received by portable electronic device 150 from transit server 142. In some embodiments, inquiry signal 124 is transmitted by gateline 120 (e.g., one of gates 118-1, 118-2) to portable electronic device 150 and/or inquiry signal 124 is received by portable electronic device 150 from gateline 120 (e.g., one of gates 118-1, 118-2). Inquiry signal 124 may include data for determining whether the holder of portable electronic device 150 viewed the first visual message and/or whether the holder of portable electronic device 150 can recall information about the first visual message. For example, inquiry signal 124 may include a question regarding an aspect of the first visual message, such as a company name, a product name, a person's name, a color, an image, an action, a word, a phrase, and the like. Inquiry signal 124 may also include a set of possible answers to the question, such as a set of possible company names, product names, names of people, and the like. Data from inquiry signal 124 may be displayed on portable electronic device 150.

At step 1016, portable electronic device 150 receives an input from the holder of portable electronic device 150 in response to the question regarding the aspect of the first visual message. The input may be a selection, a number, a character, a string of text, an audio signal, and the like. In one particular implementation, data contained in inquiry signal 124 may cause the question "What company logo appeared on the gate display?" to be displayed on portable electronic device 150, along with four choices including "Company A", "Company B", "Company C", and Company D", to which the holder of portable electronic device 150 may select the correct choice, e.g., "Company C" or an incorrect choice, e.g., "Company A" or "Company B". Portable electronic device 150 may then generate response signal 126 to include the selection of "Company C" and/or an indication that the correct choice was selected.

At step 1018, response signal 126 is transmitted by portable electronic device 150 to transit server 142 and/or response signal 126 is received by transit server 142 from portable electronic device 150. In some embodiments, response signal 126 is transmitted by portable electronic device 150 to gateline 120 (e.g., one of gates 118-1, 118-2) and/or response signal 126 is received by gateline 120 (e.g., one of gates 118-1, 118-2) from portable electronic device 150. Response signal 126 may identify portable electronic device 150 and/or the holder of portable electronic device 150. In some embodiments, response signal 126 includes the user input received by portable electronic device 150 in response to the question regarding the aspect of the first visual image presented to the user.

At step 1020, response signal 126 is analyzed by one or both of transit server 142 and gateline 120 (e.g., one of gates 118-1, 118-2) to determine whether response signal 126 correctly verifies the aspect of the first visual message. In some embodiments, response signal 126 is determined to correctly verify the aspect of the first visual message when the user input contained in response signal 126 matches with the correct answer stored in transit server 142, gateline 120, or elsewhere. In some instances, response signal 126 may itself indicate whether the holder of portable electronic device 150 correctly verified the aspect of the first visual message. In some embodiments, response signal 126 is determined to correctly verify the aspect of the first visual message by merely receiving response signal 126. For example, the transit application may cause portable electronic device 150 to transmit response signal 126 only when the user input matches with the correct answer. In some embodiments, the user merely engaging with the data contained in inquiry signal 124 may cause response signal 126 to be transmitted to one or both of transit server 142 and gateline 120.

At step 1022, a transit data augmentation amount is effected by one or both of transit server 142 and gateline 120. In some embodiments, the transit data augmentation amount may be the amount by which the value in a transit account associated with portable electronic device 150 is to be increased. For example, the transit data augmentation amount may be used to increase the digital currency in a transit user account. The digital currency may be used to purchase transit products within transit system 100 or within other transit systems outside transit system 100. In some embodiments, effecting the transit data augmentation amount may include determining the transit data augmentation amount and sending a control message causing the value in a transit account associated with portable electronic device 150 and/or the holder of portable electronic device 150 to be increased by the transit data augmentation amount. For example, when step 1022 is performed by gateline 120, gateline 120 (e.g., one of gates 118-1, 118-2) may send the control signal to transit server 142, and transit server 142 may modify the transit account so as to increase the value in the transit account by the transit data augmentation amount. When step 1022 is performed by transit server 142, transit server 142 may determine the transit data augmentation amount and may modify the transit account so as to increase the value in the transit account by the transit data augmentation amount.

At step 1024, transit server 142 increases the value in the transit account associated with portable electronic device 150 and/or the holder of portable electronic device 150 by the transit data augmentation amount. In some embodiments, transit server 142 may perform steps 1022 and 1024 concurrently. In some embodiments, gateline 120 may perform step 1022 and transit server 142 may perform step 1024.

Figure 11:
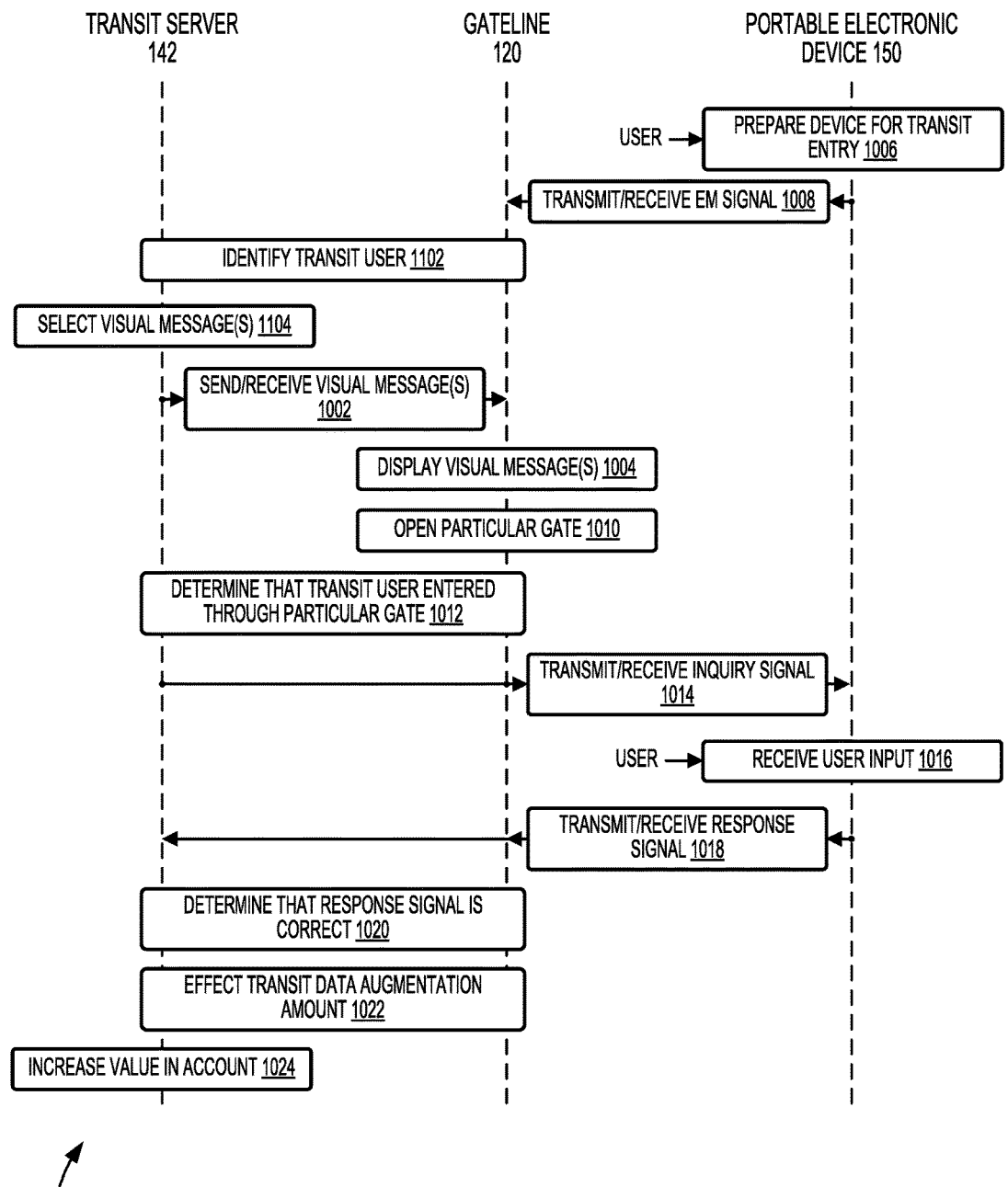
FIG. 11 illustrates a method, accordingly to some embodiments of the present invention.

FIG. 11 illustrates a method 1100, accordingly to some embodiments of the present invention. One or more steps of method 1100 may be performed by portable electronic device 150 and one or more steps of method 1100 may be performed by components of transit system 100 such as transit server 142 and gateline 120. Steps of method 1100 may be performed in an order different than the illustrated embodiment, and one or more steps of method 1100 may be omitted. One or more steps of method 1100 may be similar to one or more steps of method 1000. For example, steps 1006, 1008 of method 1100 may be similar to steps 1006, 1008 of method 1000. As another example, steps 1002-1004 and 1010-1024 of method 1100 may be similar to steps 1002-1004 and 1010-1024 of method 1000.

At step 1102, one or both of transit server 142 or gateline 120 identifies portable electronic device 150 and/or the holder of portable electronic device 150. When step 1102 is performed by gateline 120 (e.g., one of gates 118-1, 118-2), EM signal 122 may be analyzed to identify portable electronic device 150 and/or the holder of portable electronic device 150, and the identity may be sent from gateline 120 (e.g., one of gates 118-1, 118-2) to transit server 142. When step 1102 is performed by transit server 142, gateline 120 (e.g., one of gates 118-1, 118-2) may send EM signal 122 (or the data contained therein) to transit server 142 and transit server 142 may analyze EM signal 122 to identify portable electronic device 150 and/or the holder of portable electronic device 150.

At step 1104, transit server 142 selects the first visual message based on portable electronic device 150 and/or the holder of portable electronic device 150. For example, transit server 142 may analyze historical data associated with portable electronic device 150 and select the first visual message based on the historical data. For example, transit server 142 may select a visual message that has repeatedly or most often been selected by the holder of portable electronic device 150 over the past week, month, year, etc. As another example, transit server 142 may select a visual message that is different than the previously selected visual messages for the holder of portable electronic device 150. Accordingly, transit server 142 may maintain historical data for each of a plurality of portable electronic devices 150, which may be updated each time the holder of one of portable electronic devices 150 enters transit system 100.

Figure 12:
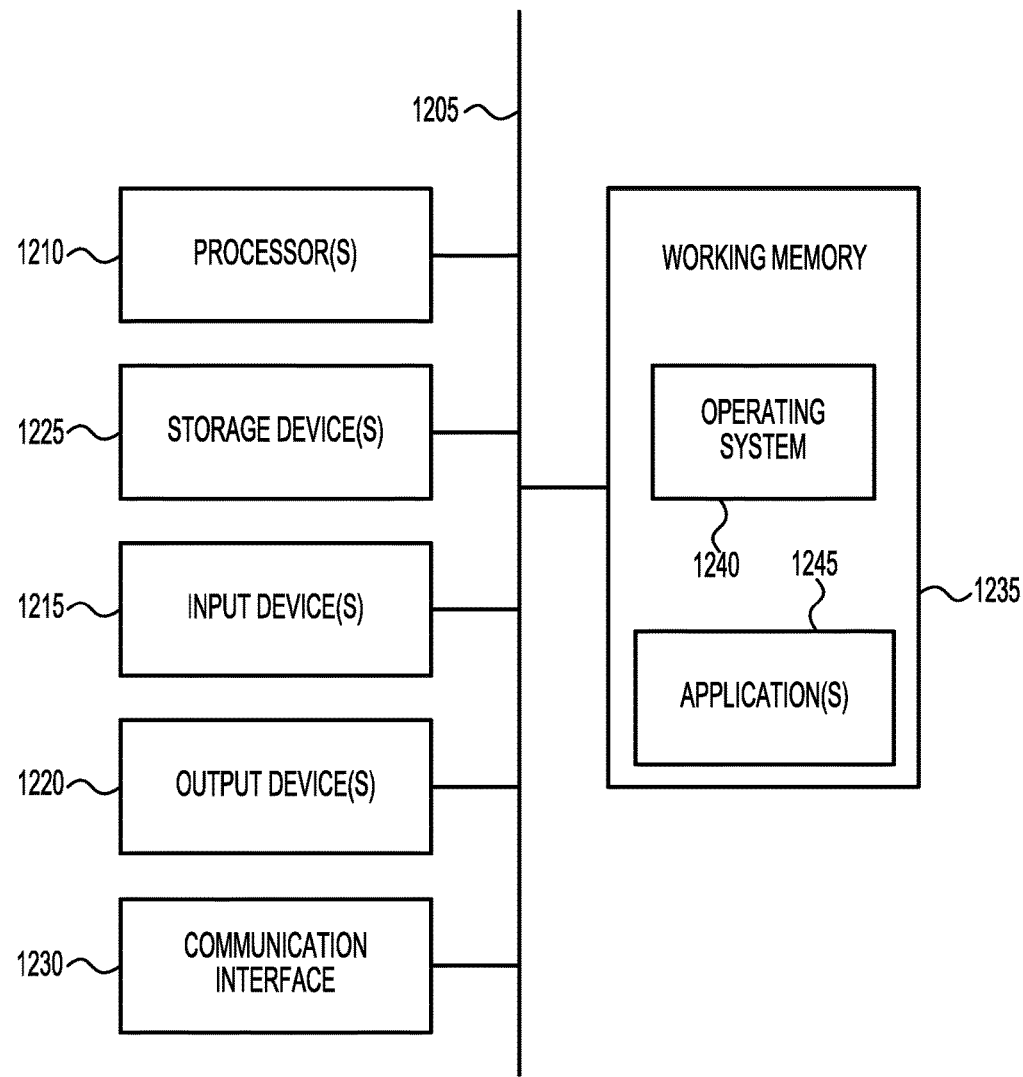
FIG. 12 illustrates a simplified computer system, according to some embodiments of the present disclosure.

FIG. 12 illustrates a simplified computer system 1200, according to some embodiments of the present invention. Computer system 1200 may be incorporated as part of the previously described computerized devices. For example, computer system 1200 can represent some of the components of transit server 142, ticket vending machine 126, access control point 128, portable electronic device 150, and the like. FIG. 12 provides a schematic illustration of one embodiment of a computer system 1200 that can perform the methods provided by various other embodiments, as described herein. FIG. 12 is meant only to provide a generalized illustration of various components, any or all of which may be utilized as appropriate. FIG. 12, therefore, broadly illustrates how individual system elements may be implemented in a relatively separated or relatively more integrated manner.

The computer system 1200 is shown comprising hardware elements that can be electrically coupled via a bus 1205 (or may otherwise be in communication, as appropriate). The hardware elements may include a processing unit 1210, including without limitation one or more general-purpose processors and/or one or more special-purpose processors (such as digital signal processing chips, graphics acceleration processors, and/or the like); one or more input devices 1215, which can include without limitation a keyboard, a touchscreen, receiver, a motion sensor, a camera, a smartcard reader, a contactless media reader, and/or the like; and one or more output devices 1220, which can include without limitation a display device, a speaker, a printer, a writing module, and/or the like.

The computer system 1200 may further include (and/or be in communication with) one or more non-transitory storage devices 1225, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1200 might also include a communication interface 1230, which can include without limitation a modem, a network card (wireless or wired), an infrared communication device, a wireless communication device and/or chipset (such as a Bluetooth™ device, an 802.11 device, a Wi-Fi device, a WiMax device, an NFC device, cellular communication facilities, etc.), and/or similar communication interfaces. The communication interface 1230 may permit data to be exchanged with a network (such as the network described below, to name one example), other computer systems, and/or any other devices described herein. In many embodiments, the computer system 1200 will further comprise a non-transitory working memory 1235, which can include a RAM or ROM device, as described above.

The computer system 1200 also can comprise software elements, shown as being currently located within the working memory 1235, including an operating system 1240, device drivers, executable libraries, and/or other code, such as one or more application programs 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a general purpose computer (or other device) to a special purpose computer that is configured to perform one or more operations in accordance with the described methods.

A set of these instructions and/or code might be stored on a computer-readable storage medium, such as the storage device(s) 1225 described above. In some cases, the storage medium might be incorporated within a computer system, such as computer system 1200. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 1210, applications 1245, etc.) Further, connection to other computing devices such as network input/output devices may be employed.

Some embodiments may employ a computer system (such as the computer system 1200) to perform methods in accordance with the disclosure. For example, some or all of the procedures of the described methods may be performed by the computer system 1200 in response to processing unit 1210 executing one or more sequences of one or more instructions (which might be incorporated into the operating system 1240 and/or other code, such as an application program 1245) contained in the working memory 1235. Such instructions may be read into the working memory 1235 from another computer-readable medium, such as one or more of the storage device(s) 1225. Merely by way of example, execution of the sequences of instructions contained in the working memory 1235 might cause the processing unit 1210 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1200, various computer-readable media might be involved in providing instructions/code to processing unit 1210 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1225. Volatile media include, without limitation, dynamic memory, such as the working memory 1235. Transmission media include, without limitation, coaxial cables, copper wire and fiber optics, including the wires that comprise the bus 1205, as well as the various components of the communication interface 1230 (and/or the media by which the communication interface 1230 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 1230 (and/or components thereof) generally will receive the signals, and the bus 1205 then might carry the signals (and/or the data, instructions, etc. carried by the signals) to the working memory 1235, from which the processor(s) 1205 retrieves and executes the instructions. The instructions received by the working memory 1235 may optionally be stored on a non-transitory storage device 1225 either before or after execution by the processing unit 1210.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A transit system comprising:
    a gateline comprising:
        a first gate comprising a first display and a receiving antenna;
        one or more processors configured to perform operations comprising:
            receiving a first visual message;
            causing the first visual message to be displayed on the first display;
            receiving, via the receiving antenna, a wireless signal transmitted by a portable electronic device; and
            determining that a holder of the portable electronic device entered the transit system through the first gate based on receiving the wireless signal;
    a transit server configured to perform actions including:
        sending the first visual message to the gateline;
        in response to the holder of the portable electronic device entering the transit system through the first gate, transmitting an inquiry signal regarding an aspect of the first visual message to the portable electronic device;
        receiving, from the portable electronic device, a response signal;
        analyzing the response signal to determine that the response signal correctly verifies the aspect of the first visual message; and
        effecting a transit data augmentation amount to an account associated with the portable electronic device.

2. The transit system of claim 1, wherein the first gate further comprises a physical barrier, wherein the gateline is configured to allow the holder of the portable electronic device to enter the transit system by removing the physical barrier.

3. The transit system of claim 2, wherein the first display is integrated with the physical barrier.

4. The transit system of claim 1, wherein the gateline further comprises:
    a second gate including a second display configured to display a second visual message, wherein the transit server is configured to send the second visual message to the gateline.

5. The transit system of claim 1, wherein the first visual message is selected by the transit server based on historical data associated with the portable electronic device.

6. The transit system of claim 1, wherein the inquiry signal includes a question regarding the aspect of the first visual message and the response signal includes a user-entered response to the question.

7. The transit system of claim 1, wherein the one or more processors are integrated with the first gate.

8. The transit system of claim 1, wherein the first display is positioned along a side of the first gate facing a non-restricted access area of the transit system.

9. A computer-implemented method comprising:
sending, by a transit server of a transit system to a gateline, a first visual message;
displaying, by a first display associated with a first gate of the gateline, the first visual message;
receiving, by the gateline via a receiving antenna associated with the first gate, a wireless signal transmitted by a portable electronic device;
determining that a holder of the portable electronic device entered the transit system through the first gate based on the receiving antenna receiving the wireless signal;
in response to the holder of the portable electronic device entering the transit system through the first gate, transmitting an inquiry signal regarding an aspect of the first visual message to the portable electronic device;
receiving, from the portable electronic device, a response signal;
analyzing the response signal to determine that the response signal correctly verifies the aspect of the first visual message; and
effecting a transit data augmentation amount to an account associated with the portable electronic device.

10. The computer-implemented method of claim 9, wherein the gateline is configured to allow the holder of the portable electronic device to enter the transit system through the first gate by removing a physical barrier associated with the first gate.

11. The computer-implemented method of claim 9, further comprising:
receiving, by the gateline from the transit server, a second visual message; and
displaying, by a second display associated with a second gate of the gateline, the second visual message.

12. The computer-implemented method of claim 9, wherein the first visual message is selected by the transit server based on historical data associated with the portable electronic device.

13. The computer-implemented method of claim 9, wherein the response signal is received by the transit server from the portable electronic device.

14. The computer-implemented method of claim 9, wherein the response signal is analyzed by the transit server.

15. The computer-implemented method of claim 9, wherein the transit data augmentation amount is effected to the account by the transit server.

16. The computer-implemented method of claim 9, wherein the inquiry signal includes a question regarding the aspect of the first visual message and the response signal includes a user-entered response to the question.

\* \* \* \* \*